Dec. 8, 1925.
A. C. CRIMMEL
1,564,470
MEASURING CUP
Filed Oct. 29, 1923
2 Sheets-Sheet 1
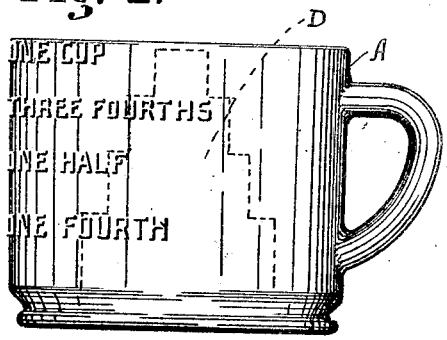
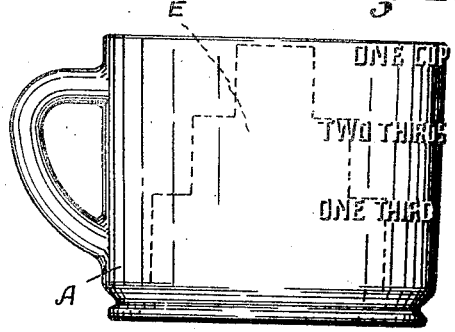
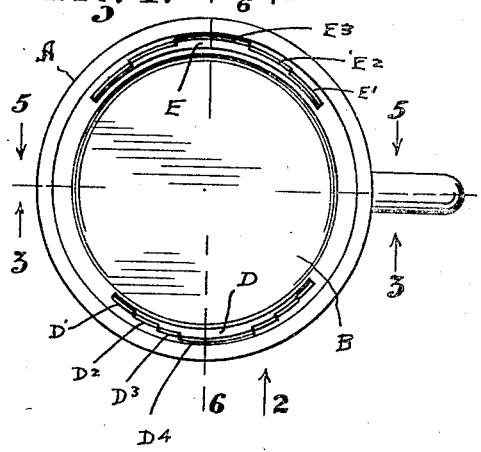
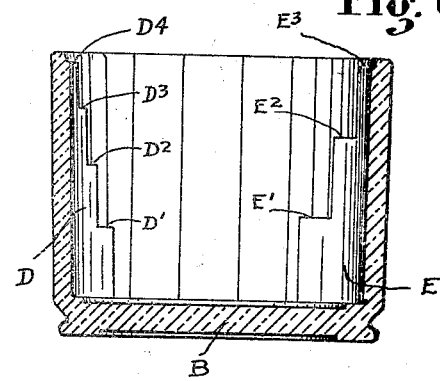
INVENTOR
ALVIE C. CRIMMEL.
By Thomas L. Ryan
ATTORNEY.

Dec. 8, 1925.  A. C. CRIMMEL  1,564,470
MEASURING CUP
Filed Oct. 29, 1923   2 Sheets-Sheet 2
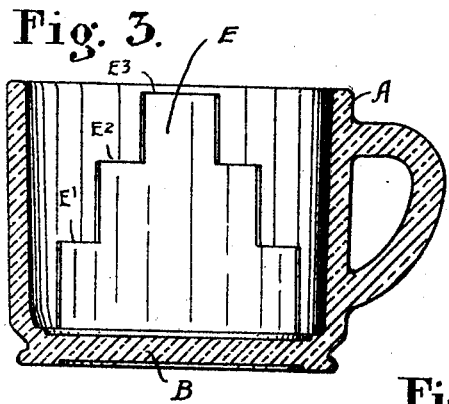
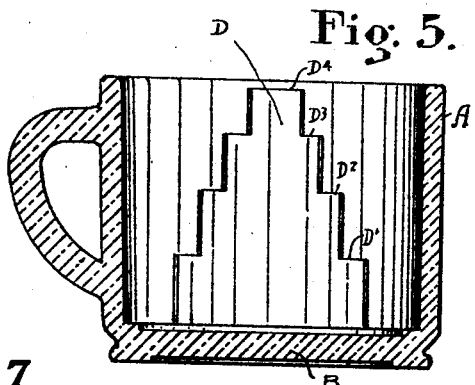
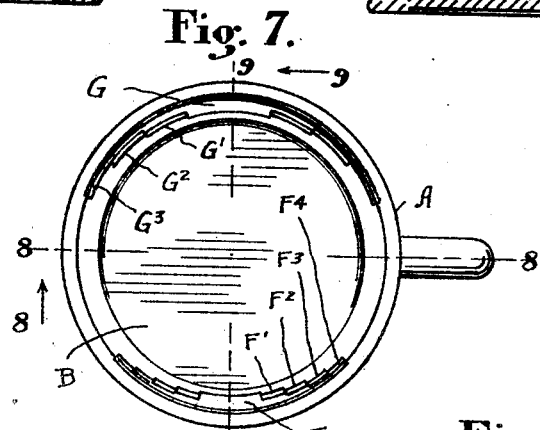
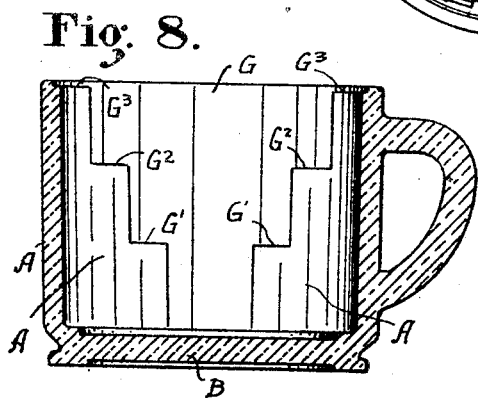
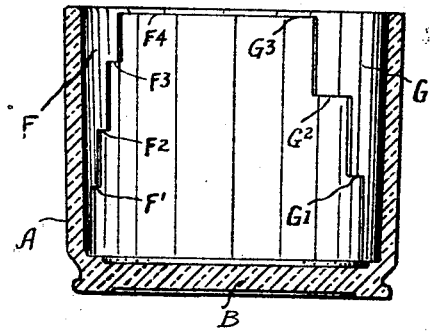
INVENTOR
ALVIE C. CRIMMEL.
BY
ATTORNEY.

Patented Dec. 8, 1925.

1,564,470

UNITED STATES PATENT OFFICE.

ALVIE C. CRIMMEL, OF HARTFORD CITY, INDIANA.

MEASURING CUP.

Application filed October 29, 1923. Serial No. 671,457.

*To all whom it may concern:*

Be it known that I, ALVIE C. CRIMMEL, a citizen of the United States, residing at Hartford City, in the county of Blackford and State of Indiana, have invented certain new and useful Improvements in Measuring Cups, of which the following is a specification.

This invention has reference to cups or vessels for the measuring of liquids, powders, or other materials, and has for its object to provide a cup of this character which is capable of being successfully manufactured on a basis of quantity production, and which cup is, at the same time, of such uniformly accurate construction, in its essential features, that true and dependable measurement of its contents, is assured.

My improved measuring cup may be of cast or pressed construction and of any suitable material; it is preferably made of transparent or translucent material such as glass, and is so designed and formed in the present embodiment, as to be considered in the class of pressed ware.

I am aware that measuring vessels have heretofore been made of glass, and in which marks or indices have been formed on the exterior face of the vessel. On account of the impossibility, in the making of articles of glass, to obtain a strictly uniform thickness of walls and bottom of the vessel; there is,— in the run of quantity production,—such variation in the height of the floor surface of the cup, with reference to the bottom side thereof, that the indicating marks on the outside surfaces of the cup are accordingly unreliable.

In the present invention I provide on the inner face of the wall of the cup, a panel or panels, either of outstanding or of recessed form, and being of altitude equal to that of the cup; each of which said panels has a succession of step like portions, the horizontal offsets of which constitute marks, easily observable upon the interior of the cup and also plainly observable from without the cup. The altitudes at which offsets occur are such as to indicate the quantity measurement of the contents filling the cup to the level of said offsets.

The objects of my invention are accomplished by, and the invention is embodied, in the new construction, combination and arrangement of elements shown in the accompanying drawings, and described in the following specification. The invention is defined in the appended claims.

Suitable characters of reference are applied to the several parts of the invention as same appear in the different views in the drawings, in which—

Figure 1 is a plan view of my improved measuring cup.

Figure 2 is a side view taken in the direction of the arrow 2 in Figure 1.

Figure 3 is a central vertical sectional view taken in the direction indicated by the arrow 3 in Figure 1.

Figure 4 is a side view taken in the direction indicated by the arrow 4 in Figure 1.

Figure 5 is a central vertical sectional view taken in the direction indicated by the arrow 5 in Figure 1.

Figure 6 is a central vertical sectional view taken on the line 6—6 and viewed in the direction of the arrow 6 in Figure 1.

Figure 7 is a top plan view in which is shown the recessed or sunken type of panel, as distinguished from the outstanding or projected type of panel as shown in Figure 1.

Figure 8 is a vertical central sectional view taken on the line 8—8 and as viewed in the direction of arrow 8 in Figure 7; and Figure 9 is a central vertical sectional view taken on the line 9—9 and seen in the direction of the arrow 9 in Figure 7.

The cup may be of a standard type of external contour as shown, and has the cylindrical body portion composed of the walls A formed integral with the bottom or floor portion B.

To provide a series of indicator marks or edge-like offsets on the inner faces of the walls at different altitudes thereon, the said wall is provided with an integrally formed panel of altitude substantially the same as that of the wall and having its lateral portions of step like form, the horizontal edges of the steps constituting said offsets. In the present embodiment of my invention the cup has two panels, each of which panels affords an independent set or group of indicator offsets.

Panels of the projection type, as shown in Figures 1 to 6 both inclusive, are designated D and E. The panel D has four steps, the offsets of which said steps are designated as $D^1$, $D^2$, $D^3$ and $D^4$. Descriptive designations of these offsets, commencing at the bottom,—may consist of the markings on the exterior surface of the walls,—One fourth, One half, Three fourths and One cup. The altitudes at which the said offsets occur are predetermined and accord with the level assumed by the different content quantities indicated.

The panel E has three steps, the offsets of which said steps are designated as $E^1$, $E^2$ and $E^3$. Descriptive designations of these offsets,—commencing at the bottom,—may consist of the markings One third, Two thirds, and One cup. The altitudes at which said offsets occur are predetermined by the registration of the level assumed by the different content quantities indicated.

In Figures 7, 8 and 9, are shown panels of the recessed or sunken type; the panel F having the four steps, with their offsets designated as $F^1$, $F^2$, $F^3$ and $F^4$; and the panel G having three steps, with their offsets designated as $G^1$, $G^2$ and $G^3$. Symbols or descriptive terms of any desired character may be applied to the outer faces of the walls A, and adjacent to these offsets.

Panels of either the relief type or the sunken type are equally effective and are of uniform economy in production. Where preferable, by reason of the peculiar nature of the glass that is being worked, or if, for the measurement of materials of a particular class or specific character which would preferably suggest the use of the sunken type of panel, there is provided a corresponding type of plunger. The die on the plunger for the sunken type of panel being in relief on the plunger head, and in recessed form for the relief type of panel. Because of the above utilitarian features, it may be preferable, and of a simple operation in manufacturing, to produce the vessels provided with either the sunken or relief type of panel, and thereby economically take care of variations required by the trade.

Requirements for measuring vessels of various heights and thicknesses, and for the measurement of materials of all consistencies or temperatures, are readily met by virtue of my invention, since regardless of the variations required thereby there is at all times the constant dependability as to the location of the indicia with reference to the floor of the vessel. Furthermore, the same results may be accomplished, in a like manner, without departing from this invention, by forming the indicia or indicating offsets or edges of the step-like panel, one above the other, in a panel having straight sides. In this instance the step-like formations are provided on the surface of the panel rather than along the lateral edges thereof, which accomplishes substantially the same purposes in the same manner.

The faces of the panels, and of the inner surfaces of the walls are slightly inclined from the true perpendicular, and the cup in its entirety is capable of being formed in by the press mold and plunger operation well known in the art of making articles of glass.

By the above described construction, it is apparent that the positions of the indicator offsets are correct with reference to the floor line of the cup, and that in the work, of producing the cups, there can be no possible variation of the relation between these offsets, and the floor surface of the cup, of the inner surfaces of the cup walls. The measuring cup so made is dependable therefore for use where accurate measuring, is demanded.

It is practicable to embody my invention in vessels of different heights and forms, and different combinations of offsets and designations therefor, suitable to different kinds of measures, may be used. While I have shown a straight line kind of offset and which is easily observed either from the exterior, or the interior of the cup, it is practicable to make the offset line of serrated or undulating form.

The utility of my invention makes the same of advantage to dispensers of all kinds of liquid and dry measure merchandise, as it is possible to have a true and dependable indication of a measure in a glass vessel, easy to be discerned from the outside, by the customer, as well as upon the inside, by the dispenser. Objections to measuring vessels or cups made of glass as hitherto constructed have been, that such indicating marks as have been provided have been inaccurate and unreliable.

Claims:

1. A measuring vessel having its wall provided with an integral pyramidally-shaped panel extending over a portion of the inner surface in low relief and having an altitude with reference to the floor of the vessel to indicate the measure of the vessel contents, said panel being of step-like formation, to permit of the retraction of the plunger by which the vessel is pressed in the mold, and the horizontal edges of the said steps constituting measuring indications at various altitudes.

2. In a measuring vessel, in combination with the wall thereof, of a panel formed integral therewith having its inner surface inclined outwardly toward the top to permit of the retraction of the plunger by which the vessel is pressed in the mold, and having its edges of stepped formation, the horizontal edges of the steps constituting measuring indications.

3. A translucent measuring vessel having a plurality of measuring indicia formed on the interior surface for indicating and measuring the contents thereof, said indicia being cast integral with the interior surface of the vessel and being in step formation from the bottom to the top thereof, each indicia protruding beyond the indicia immediately above the same.

In testimony whereof I affix my signature.

ALVIE C. CRIMMEL.